United States Patent [19]

Dieffenderfer et al.

[11] Patent Number: 5,224,213
[45] Date of Patent: Jun. 29, 1993

[54] PING-PONG DATA BUFFER FOR TRANSFERRING DATA FROM ONE DATA BUS TO ANOTHER DATA BUS

[75] Inventors: James N. Dieffenderfer, Endicott, N.Y.; Ronald N. Kalla, Zumbro Falls, Minn.

[73] Assignee: International Business Machines Corporation, Armonk, N.Y.

[21] Appl. No.: 402,935

[22] Filed: Sep. 5, 1989

[51] Int. Cl.[5] .................... G06F 13/00; G06F 13/28
[52] U.S. Cl. .................... 395/250; 364/DIG. 1; 364/239; 364/239.1; 364/239.51; 364/239.6
[58] Field of Search ... 364/200 MS File, 900 MS File; 395/250

[56] References Cited

U.S. PATENT DOCUMENTS

| | | | |
|---|---|---|---|
| 4,442,485 | 4/1984 | Ota et al. | 364/200 |
| 4,455,606 | 6/1984 | Cushing et al. | 364/200 |
| 4,489,381 | 12/1984 | Lavallee et al. | 364/200 |
| 4,571,671 | 2/1986 | Burns et al. | 364/200 |
| 4,716,525 | 12/1987 | Gilanyi et al. | 364/200 |
| 4,805,094 | 2/1989 | Oye et al. | 364/200 |
| 4,885,699 | 12/1989 | Taoda et al. | 364/200 |

Primary Examiner—Eddie P. Chan
Attorney, Agent, or Firm—Richard E. Bee; Arthur J. Samodovitz

[57] ABSTRACT

A ping-pong data buffer mechanism for transferring data from one data bus to another data bus is described. This mechanism includes a dual port storage mechanism having a single storage array and two independent ports with each port having its own separate data, address and control lines. Write circuitry is coupled to one of the independent ports for receiving data from one of the data buses and storing it into a first portion of the storage array. Read circuitry is coupled to the other of the independent ports for simultaneously reading data from a second portion of the storage array and supplying it to the other data bus. Mode control logic is provided for enabling the storing and reading functions of the first and second portions of the storage array to be interchanged back and forth from time to time so that data may be read from one portion while data is being stored into the other portion and vice versa. In a second embodiment, a pair of dual port storage mechanisms are utilized for facilitating the transfer of data from a wider data bus to a narrower data bus or vice versa.

1 Claim, 8 Drawing Sheets

PING-PONG DATA BUFFER FOR TRANSFERRING DATA FROM ONE DATA BUS TO ANOTHER DATA BUS

TECHNICAL FIELD

This invention relates to data buffer mechanisms for use in digital data processing systems for transferring data from one data bus to another data bus and, particularly, to such data buffer mechanisms which utilize a storage array to buffer the data being transferred.

BACKGROUND OF THE INVENTION

A need frequently arises to buffer the data being transferred from a first data bus to a second data bus. This need typically occurs where the busses have different operating characteristics, different timing requirements or different handshaking protocols associated therewith. For example, each data bus may be an independently asynchronous bus with no direct synchronization between the two busses. Another example is the case where one of the busses may sometimes be busy with other matters and may not be available for data transfers to the other bus when the latter is ready to engage in a data transfer. A further example is the case where the width of one data bus is different from the width of the other data bus, that is, the numbers of data lines in the two busses are not the same. Another example is the case where the units coupled to the busses have different data transfer rates.

It is known to use a storage array or memory array to provide a buffer between two data busses. Data is received from one data bus and stored in the storage array in one manner and is thereafter read out and supplied to the other data bus in a somewhat different manner. The storage array provides a flexible medium or buffer for accommodating the differences associated with the two data busses and the operating units coupled to the two busses.

One form of data buffer mechanism that has been heretofore proposed is a so-called "ping-pong" buffer mechanism. In this case, a pair of storage arrays are provided and data received from one bus is written into one array while data is read out of the other array and supplied to the other bus. The read and write functions of the two storage arrays are interchanged back and forth from time to time so that data is written into one array and then the other array in an alternating manner and data is read out from the other array and then the one array in an alternating manner which is the opposite of that used for the writing. A data buffer mechanism of this type can provide more efficient and faster overall data transfer operations in various applications.

SUMMARY OF THE INVENTION

The present invention provides a data buffer mechanism for transferring data from a first data bus to a second data bus in an improved and more efficient manner. In one embodiment, a ping-pong buffer mechanism is provided which utilizes a dual port storage mechanism having a single storage array and two independent ports each with its own separate data, address and control lines. The two ports operate completely independently of one another so that data may be written at one address of the storage array simultaneously with the reading of data from a different address of the storage array. Write circuitry is coupled to one of the independent ports of the dual port storage mechanism for receiving data from a first data bus and writing or storing it into a first portion of the storage array. Read circuitry is coupled to the other of the independent ports of the dual port storage mechanism for reading data from a second portion of the storage array and supplying it to the second data bus, such reading of data from the second portion occurring simultaneously with the storing of data into the first portion of the storage array. Mode control logic is provided for enabling the reading and storing functions of the first and second portions of the storage array to be interchanged back and forth from time to time to provide the so-called "ping-pong" effect.

The independent nature of the two storage array ports enables one portion of the storage array to be asynchronously filled while the other portion of the storage array is asynchronously emptied. This provides an efficient transfer of data between two independently asynchronous data busses and helps to minimize the occurrence of "wait states" on one or the other or both of the data busses.

In another embodiment of the invention, a plurality of dual port storage mechanisms are utilized for transferring data from a wider data bus to a narrower data bus or vice versa in a very efficient and rapid manner. The plural dual port storage mechanisms are operated in a coordinated ping-pong mode. Data being transferred to or from the wider data bus is simultaneously stored into or read out from corresponding first portions of the storage arrays. Data being transferred to or form the narrower data bus is written into or read out from corresponding second portions of the different storage arrays, one storage array at a time in an alternating manner. Thus, maximized data transfer rates are provided for each of the two dissimilar data busses.

For a better understanding of the present invention, together with other and further advantages and features thereof, reference is made to the following descriptions taken in connection with the accompanying drawings, the scope of the invention being pointed out in the appended claims.

BRIEF DESCRIPTION OF THE DRAWINGS

Referring to the drawings.

DESCRIPTION OF THE FIG. 1 DATA PROCESSING SYSTEM

Figure 1:
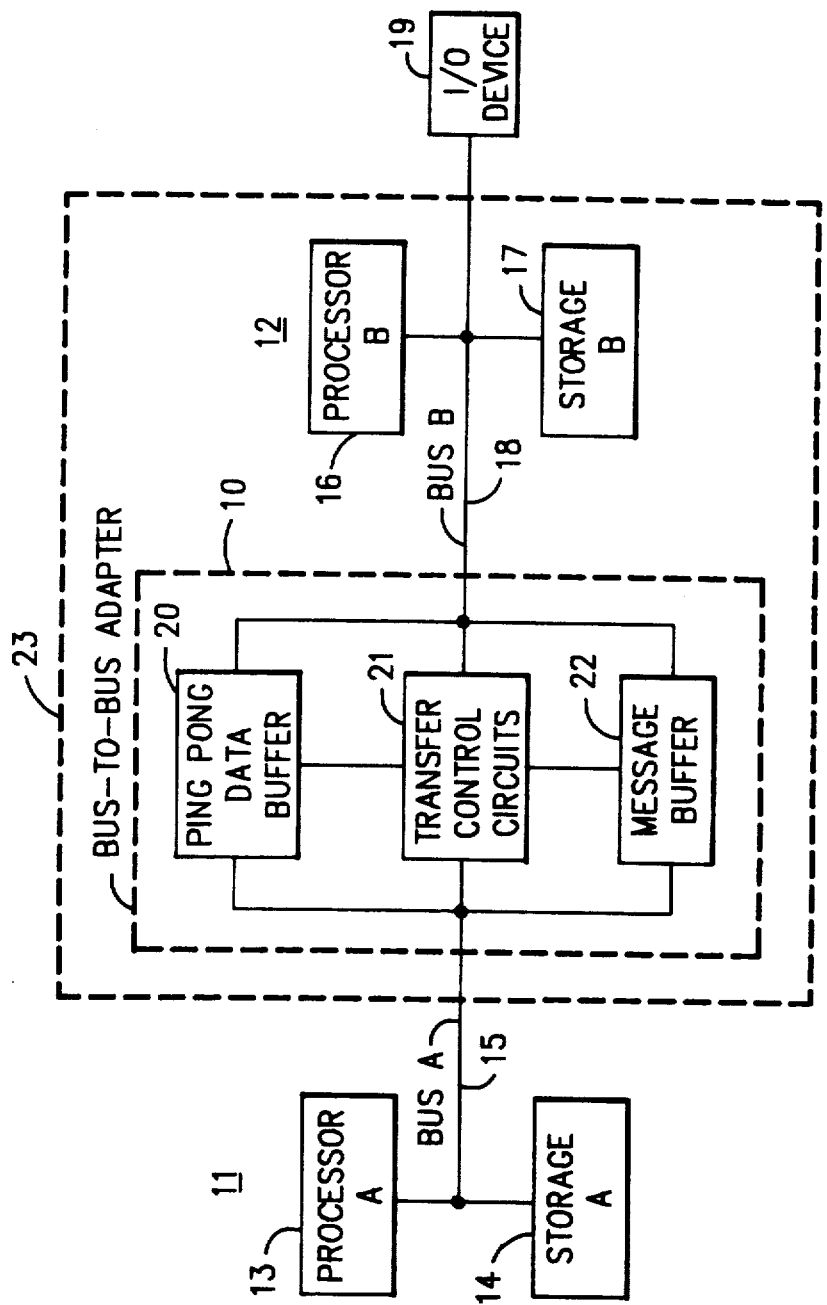
FIG. 1 is a schematic block diagram of a representative digital data processing system in which the present invention may be used to advantage.

Referring to FIG. 1, there is shown a representative digital data processing system wherein the present invention maybe used to advantage. In this system, the invention is used in a bus-to-bus adapter unit 10 which is used to couple a first digital computer 11 to a second digital computer 12 for purposes of transferring data from one computer to the other or vice versa. The first computer 11, herein referred to as computer A, includes a processor unit 13, a storage unit 14 and an input/output (I/O) bus 15, the latter being referred to herein as "bus A". The second computer 12, herein referred to as computer B, includes a processor unit 16, a storage unit 17 and an I/O bus 18, the latter being referred to herein as "bus B". An I/O device 19 is shown as being coupled to the I/O bus B.

The processor units 13 and 16 may be similar or dissimilar in character and each represents the central processing unit (CPU) for its respective computer. Each of the I/O busses 15 and 18 will typically include a set of data bus lines, a set of address bus lines and a set of control bus lines. In some cases, the same set of bus lines may be used for both data and addresses with this being done in a time multiplexed manner.

The bus-to-bus adapter 10 includes a ping-pong data buffer unit 20, transfer control circuits 21 and a message buffer 22. The ping-pong data buffer 20 is constructed in accordance with the present invention and is used for transferring data from the data lines of bus A to the data lines of bus B or vice versa. Thus, the ping-pong data buffer in the disclosed embodiments is bidirectional in character so that data may be transferred in either direction. The transfer control circuits are coupled to the control lines of bus A and bus B and are constructed to provide the handshaking procedures which are needed for the two busses, each of which is assumed herein to be of an asynchronous nature. Message buffer 22 is bidirectional in character and is used to transfer command, status and address type messages from one processor to the other and vice versa. Transfer control circuits 21 also coordinate the functions of the ping-pong data buffer 20 and the message buffer 22 with the handshaking operations occurring on bus A and bus B.

As an example of a particular application, the bus-to-bus adapter 10 and the second computer 12 may be used to provide an I/O adapter 23 for coupling an I/O device 19 to a host processor. In this case, processor 13 would become the host processor and storage unit 14 would become the main storage unit for the host processor. In the typical I/O adapter case, the processor 16 would take the form of a microprocessor, in which case bus B would be the microprocessor I/O bus. Also in some cases, two or more I/O devices may be coupled to the bus B.

DESCRIPTION OF THE FIG. 2 DATA BUFFER EMBODIMENT

Figure 2:
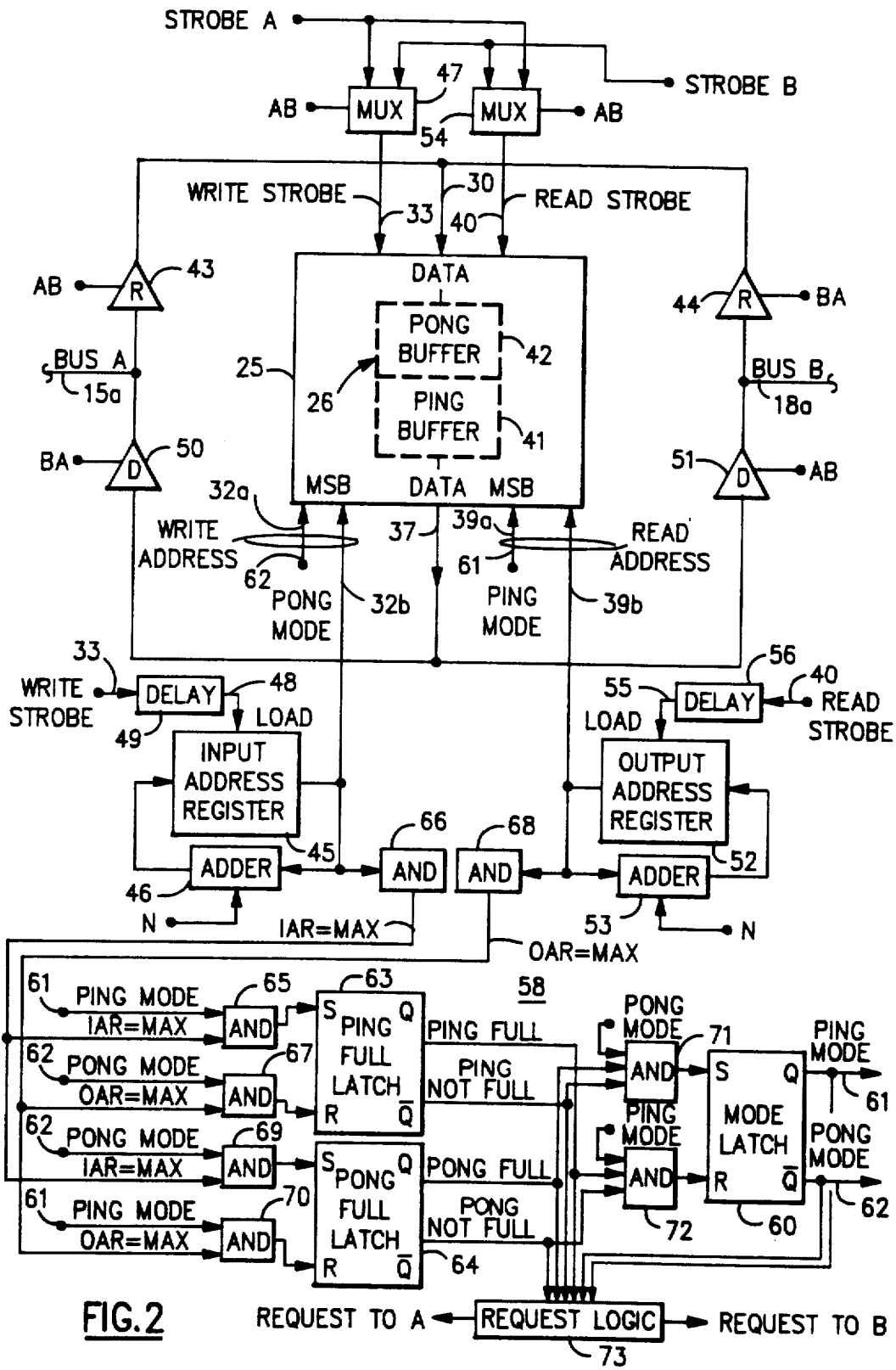
FIG. 2 is a schematic block diagram showing a first embodiment of a ping-pong data buffer mechanism constructed in accordance with the present invention.

Referring to FIG. 2, there is shown a first embodiment of a ping-pong data buffer mechanism for transferring data from a data bus portion 15a of I/O bus A to the data bus portion 18a of the I/O bus B or vice versa. This data buffer mechanism is bidirectional in nature such that data may be transferred in either direction between the two data buses. This data buffer mechanism of FIG. 2 includes a dual port storage mechanism 25 having a single storage array and two independent I/O ports with each port having its own separate data, address and control lines. The details of a typical dual port storage mechanism are shown in FIG. 3.

Figure 3:
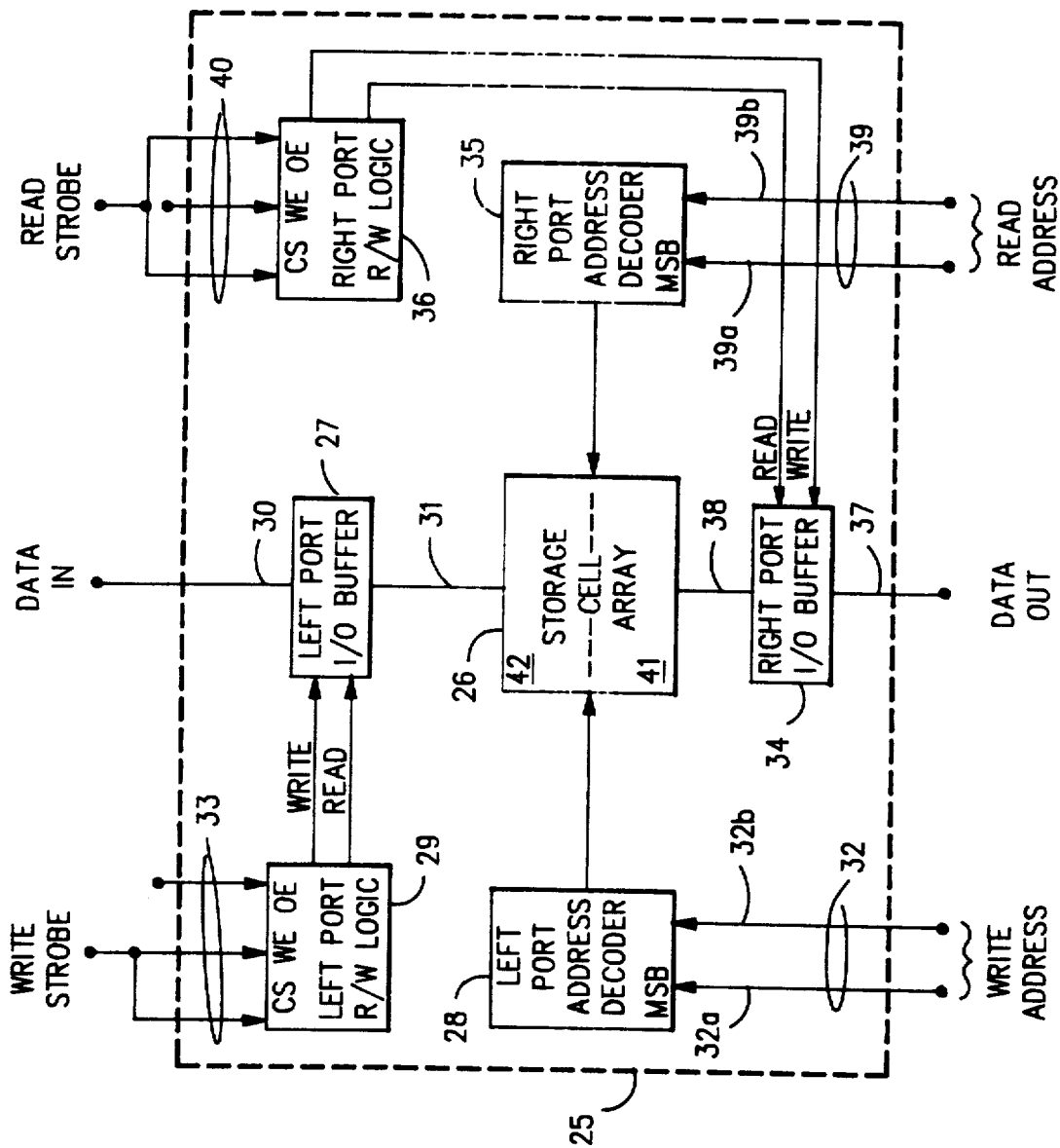
FIG. 3 shows in greater detail the internal construction of a typical dual port storage mechanism which may be used in the embodiment of FIG. 2.

Referring to FIG. 3, the dual port storage mechanism 25 there shown includes a single storage array 26 and two independent I/O ports with each port having its own separate data, address and control lines. The first independent port, referred to in FIG. 3 as the "left" port, includes a left port I/O buffer 27, a left port address decoder 28 and left port read/write (R/W) logic 29. Data lines 30 for the left port are connected to one side of the left port I/O buffer 27, while the other side of such buffer 27 is connected by way of data lines 31 to a first set of internal data lines inside the storage cell array 26. The address lines 32 for the left port are connected to the left port address decoder 28, the output of which is connected to a first set of internal address lines in the storage array 26. The control lines 33 for the left port are connected to the left port read/write logic 29. This R/W logic 29 provides either a write control signal or a read control signal to the left port I/O buffer 27 for determining the direction in which the buffer 27 transfers data. Buffer 27 is bidirectional in nature. When the write control line is active, buffer 27 transfers data from the data lines 30 to the data lines 31 for storage in the storage array 26. Conversely, when the read control line is active, buffer 27 transfers data from the data lines 31 to the data lines 30.

The second independent I/O port of the dual port storage mechanism 25 is referred to herein as the "right" port. This right port includes a right port I/O buffer 34, a right port address decoder 35 and right port read/write (R/W) logic 36. The data lines 37 for the right port are connected to one side of the right port I/O buffer 34, while the other side of this buffer 34 is connected by data lines 38 to a second internal set of data lines in the storage array 26. Address lines 39 for the right port are connected to the right port address decoder 35, the output of which is connected to a second set of internal address lines in the storage array 26. The control lines 40 for the right port are connected to right port read/write logic 36. The r/w logic 36 supplies either a write control signal or a read control signal to the write port I/O buffer 34. The write port I/O buffer 34 is bidirectional in nature. When the write control line is active, buffer 34 supplies data on the data lines 37 to the data lines 38 for storage in the storage array 26. Conversely, when the read control line is active, the right port I/O buffer 34 transfers data from the data lines 38 to the data lines 37.

The notations and legends used within the dash-lined box 25 in FIG. 3 refer to functions which are available within the dual port storage mechanism 25, independently of the particular application in which the dual port storage mechanism 25 may be used. In this regard, CS denotes chip select, WE denotes write enable, OE denotes output enable and MSB denotes most significant bit. The line identifying legends shown outside of the dash-lined box 25 relate to the particular application shown in FIG. 2.

The left port units and the right port units in FIG. 3 operate independently of one another. Both ports may simultaneously access the storage array 26. Thus, the left port may be either writing data into or reading data out of the storage array 26 at the same time that the right port is writing data into or reading data out of the storage array 26.

In the FIG. 2 embodiment, the left port is dedicated to writing data into the storage array 26 and the right port is dedicated to reading data out of the storage array 26. The write dedication is accomplished by supplying write strobe signals to the chip select (CS) and the write enable (WE) inputs of the left port R/W logic 29. As a result, only the write control signal line to the left port I/O buffer 27 will be activated. The read dedication is accomplished by supplying read strobe signals to the chip select (CS) and the output enable (OE) inputs of the right port R/W logic 36. As a result, only the read control signal line running to the right port I/O buffer 34 will be activated. Thus, in the FIG. 2 embodiment, the left port data lines 30 will be used only for inputting data, while the right port data lines 37 will be used only for outputting data.

As will be seen, the dual port storage mechanism 25 is manipulated by the external circuits so that the storage array 26 is caused to provide a first portion 41 and a second portion 42, one of which is used for writing data and the other of which is used for reading data and vice versa. This is caused by proper manipulation of the most significant bit (MSB) input address lines of the two address decoders 28 and 35. This is accomplished by placing a binary zero value on the write address MSB line 32a whenever a binary one value is placed on the read address MSB line 39a and vice versa. A binary value of zero on an MSB address line causes the associated address decoder to address the lower half of the address range for the storage array 26. When a binary one value appears on the MSB address line, the associated address decoder addresses the upper half of the address range for the storage array 26. For the left port decoder 28, the remaining address lines 32b are used to address the various individual address lines in either the lower half 41 or the upper half 42 of the storage array 26 as selected by the binary value on the MSB line 32a. In a similar manner the other address lines 39b for the right address decoder 35 are used to address the various address lines in either the lower half 41 or the upper half 42, as determined by the binary value on the MSB line 39a.

Dual port storage mechanisms having the internal construction shown in FIG. 3 are presently available on the commercial market. One such dual port storage mechanism is marketed by the Integrated Circuits Division of Fujitsu Microelectronics, Inc. of San Jose, Calif. Another such dual port storage mechanism is marketed by Integrated Device Technology, Inc. of Santa Clara, Calif. As marketed, these mechanisms are sometimes referred to as dual port RAM'S or dual port random access memories.

The data buffer mechanism of FIG. 2 also includes write circuitry coupled to a first one of the independent ports (the left port) of the dual port storage mechanism 25 for receiving data from one of the data buses 15a and 18a and storing it into a first portion (e.g., the lower portion 41) of the storage array 26. This write circuitry includes data input circuitry for supplying data from one of the data buses 15a and 18a to the data lines 30 of the first port of the dual port storage mechanism 25.

This data input circuitry includes data input multiplex circuitry for selectively enabling either the transfer of data from either the bus A data bus 15a or the bus B data bus 18a to the first port data lines 30. This data input multiplexing circuitry includes receiver circuits 43 which couple the bus A data lines 15a to the first port data lines 30 and receiver circuits 44 which couple the bus B data lines 18a to these same first port data lines 30.

Receiver circuits 43 are enabled for data transfer purposes by a first direction control signal AB, while the receiver circuits 44 are enabled for data transfer purposes by a second direction control signal BA. The AB control signal is active when data is to be transferred from bus A to bus B and the BA control signal is active when data is to be transferred in the opposite direction, namely, from bus B to bus A. These direction control signals are supplied by a direction control latch (not shown) located in the transfer control circuits 21 of FIG. 1. This direction control latch is initialized by one of the processors 13 and 16 to establish the direction of data transfer. The AB and BA signals are never active at the same time. Thus at any given moment only one of the data buses 15a and 18a is able to supply data to the data input lines 30 of the dual port storage mechanism 25. When either receiver circuits 43 or receiver circuits 44 are not enabled, their output lines are tri-stated, that is, are placed in a high impedance condition.

The write circuitry of FIG. 2 further includes input address counter circuitry for supplying a multibit address to the multiple address lines 32b of the first port of the dual port storage mechanism 25. This input address counter circuitry includes a multibit input address register 45 and a multibit binary adder circuit 46. Normally, the input address register 45 is initialized to a zero count condition. The count value in address register 45 is supplied to a first input of the adder 46. A numerical value N is supplied to a second input of the adder 46 and added to the address register count value. The numerical value N represents the number of bytes of data transferred to the storage array 26 during any given write in of data to any given storage line in the storage array 26. The new or next storage address appearing at the output of adder 46 is loaded back into the input address register 45 shortly after data is written into the currently addressed line in the storage array 26. In this manner, the input address value in register 45 is incremented or updated each time a line of data is written into the storage array 26.

The write circuitry of FIG. 2 further includes strobe circuitry for supplying strobe signals to at least one of the control lines 33 of the first port of the dula port storage mechanism 25 for causing the data then appearing on the input data lines 30 to be written into the storage array 26. This write strobe circuitry includes a multiplexer circuit 47 for selecting either strobe A signals initiated by the A processor 13 or strobe B signals initiated by the B processor 16. The choice of which strobe signals to use is determined by the AB direction control signal which is supplied to the multiplexer 47. If the AB signal is active, the strobe A signals are selected and supplied to the write strobe control line 33. If, on the other hand, the AB control signal is not active, then the strobe B signals are instead selected and supplied to the write strobe control lines 33. In this manner, the write strobe signals are obtained from the processor which is supplying the data to be written into the storage array 26.

Depending on the particular type of processor being used, the strobe A signals may be obtained directly from one of the control lines in bus A or, alternatively, from the transfer control circuits 21 of FIG. 1. In the latter case, the transfer control circuits 21 would include circuitry connected to one or more control lines in bus A for responding to appropriate control signals on bus A and producing the strobe A signals which are then supplied to the FIG. 2 data buffer. Similar considerations apply to the strobe B signals.

The write strobe circuitry of FIG. 2 also includes circuitry for supplying the selected write strobe signals to a count update line 48 of the input address register 45 for updating the count value therein. These write strobe signals are supplied to the count update line 48 by way of a delay circuit 49 which delays the updating of the input address register 45 by a slight amount sufficient to insure that the data on input data lines 30 is properly written into the storage array 26 before the address is changed. The appearance of a strobe signal on the count update line 48 causes the next address then appearing at the output of adder 46 to be loaded into the input address register 45.

The data buffer mechanism of FIG. 2 further includes read circuitry coupled to the second of the independent ports of the dual port storage mechanism 25 for reading data from a second portion (e.g., upper portion 42) of the storage array 26 and supplying it to the other of the data buses 15a and 18a. The other data bus in this case is the one that is not being used to supply the data to the input data lines 30 of the array 26. Such reading of data from the second portion of the storage array 26 occurs simultaneously with the storing of data into the first portion of the storage array 26.

This read circuitry includes data output circuitry for supplying data from the data lines 37 of the second port of the dual port storage mechanism 25 to the other of the data buses 15a and 18a. This output circuitry includes data output multiplexing circuitry for selectively transferring data from the data output lines 37 to either the bus A data bus 15a or to the bus B data bus 18a. This multiplexing circuitry includes driver circuits 50 and driver circuits 51 which respectively couple the data output lines 37 to respective ones of the data buses 15a and 18a. Driver circuits 50 are activated by the direction control signal BA and, when activated, serve to supply the storage array output data to the data bus 15a. Driver circuits 51, on the other hand, are activated by the direction control signal AB and, when activated, serve to transfer the storage array output data to the bus B data bus 18a. Only one of these direction control signals AB and BA is active at any given moment. The AB signal is active when data is being transferred from bus A to bus B and, conversely, the BA signal is active when data is being transferred from bus B to bus A.

When data is being transferred from bus A to bus B, the receivers circuits 43 and the driver circuits 51 are activated. Thus, data on bus A is stored into the storage array 26 via receivers 43 and data is read out of the storage array 26 and supplied by drivers 51 to the second bus, bus B. Conversely, when data is being supplied from bus B to bus A, the receiver circuits 44 and the driver circuits 50 are activated. In this case, data from bus B is stored into the storage array 26 and data is read out of the storage array 26 via receiver circuits 44 and supplied by driver circuits 50 to the other bus, in this case bus A. In this manner, the data buffer mechanism of FIG. 2 is bidirectional in nature.

The read circuitry of FIG. 2 also includes output address counter circuitry for supplying a multibit address to the multiple address lines 39b of the second port of the dual port storage mechanism 25. This output address counter circuitry includes a multibit output address register 52 and a multibit binary adder circuit 53. Initially, the output address register 52 is reset to contain a starting address value of, for example, zero. This initial starting address must be the same as the initial starting address for the input address register 45. This address value is supplied to a first input of the adder 53. A numerical value N is supplied to the second input of the adder 53. This value N represent the number of bytes of data read out of the storage array 26 during any single access of such storage array. The output of adder 53 is supplied back to the output address register 52 to provide the next address value for such register 52. This next address value is loaded into the register 52 sortly after the data for the present address is read out of the storage array 26. In this manner, the address in register 52 is continually updated as successive lines of data are read out of the storage array 26.

The read circuitry of FIG. 2 further includes strobe circuitry for supplying strobe signals to at least one of the control lines 40 of the second port of the dual port storage mechanism 25 for causing the reading of data from the storage array 26. This strobe circuitry includes a multiplexer circuit 54 for selecting between the strobe A signals and the strobe B signals and supplying the selected signals to the control lines 40 of the second port. Multiplexer 54 is controlled by the direction control signal AB. The strobe A and strobe B lines are connected to opposite inputs of the multiplexer 54, as compared to the multiplexer 47 for the write strobe. Thus, when data is being transferred from bus A to bus B, the strobe B signals are selected and supplied to the control lines 40 to provide the read strobe signals. Conversely, when data is being supplied from bus B to bus A, the direction control signal AB is inactive and the strobe A signal line is selected by the multiplexer 54 to supply the strobe A signals to the control lines 40 to provide the read strobe. In this manner, the read strobe signals supplied to the storage array 26 are provided by the processor which is to receive the data being read out of the storage array 26.

The read strobe circuitry of FIG. 2 also includes circuitry for supplying the selected read strobe signals to a count update line 55 of the output address register 52 for updating the count value in such register 52. In particular, the appearance of a strobe signal on the count update line 55 causes the next address value appearing at the output of adder 53 to be loaded into the output address register 52. The read strobe signal is supplied to the count update line 55 by way of a delay circuit 56 which provides a slight delay in the updating of the address register 52 to insure that the data for the current address has been properly read out of the storage array 26.

Figures 4, 5:
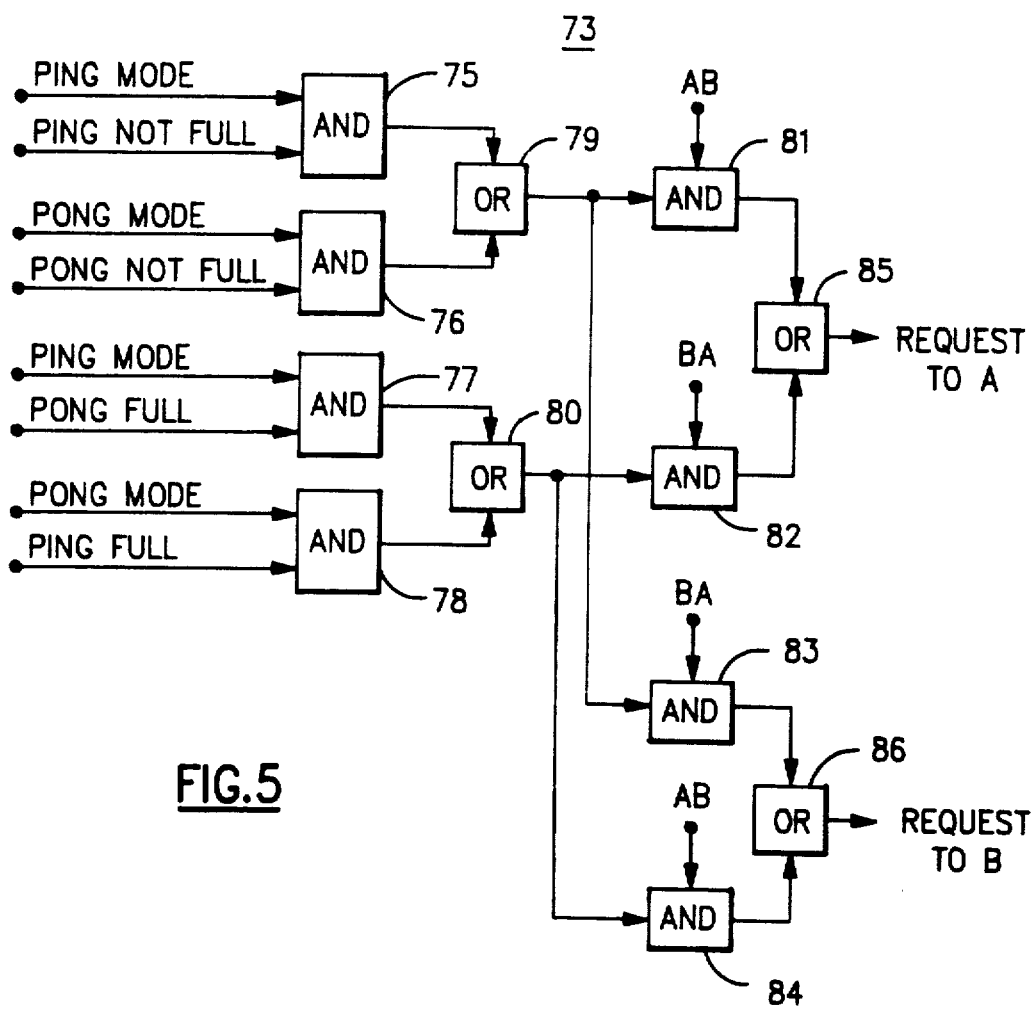
FIG. 4 is a chart used in explaining the operation of the mode control logic used in FIG. 2.
FIG. 5 shows in greater detail the internal construction of the request logic of FIG. 2.

The data buffer mechanism of FIG. 2 further includes mode control logic 58 coupled to the write circuitry and to the read circuitry for interchanging the functions of the first and second portions 41 and 42 of the storage array 26 so that data from the first data bus is stored into the opposite portion of the array 26 while data is being read from the other opposite portion and supplied to the second of the data buses 15a and 18a. This mode control logic includes two-state latch circuitry 60 having a pair of opposite plurality output lines 61 and 62, one of which (line 61) is connected to the most significant bit address line 39a for the read port of the dual port storage mechanism 25 and the other of which (line 62) is connected to the most significant bit address line 32a for the write port of the dual port storage mechanism 25. The chart of FIG. 4 shows the operating states for this mode latch 60. As there indicated, the output lines 61 and 62 are always of opposite plurality relative to one another. When output line 61 (Q output) is at a binary one level, the other output line 62 ($\overline{Q}$ output) is at a binary zero level. Conversely, if the output line 61 is at a zero level, then the other output line 62 is at a binary one level.

The mode latch output line 61 is connected to the MSB address line 39a for the port which is dedicated to doing the reading in the present embodiment. The other mode latch output line 62, on the other hand, is connected to the MSB address line 32a for the storage port which is dedicated to doing the write function in the present embodiment. Since the most significant bit (MSB) address line determines which one of the upper and lower halves 42 and 41 of the storage array 26 is being addressed and since the mode latch output lines 61 and 62 are always of opposite polarity, this means that the write function will always be occurring for a different one of the upper and lower portions 42 and 41 than is being used for the read function. The use of the mode latch 60 in this manner makes it impossible to both read and write to the same portion of the storage array 26 at any given time. This eliminates contention problems in the dual port storage mechanism 25 by preventing both read and write access to the same storage line in the storage array 26 at any given moment. This eliminates the need for access arbitration circuitry in the dual port storage mechanism 25. If a commercially available dual port storage mechanism is being used and if such mechanism includes access arbitration circuitry, then such circuitry is not used in the present embodiment.

The read and write functions of the lower and upper portions 41 and 42 of the storage array 26 are interchanged back in forth from time to time so that data from one of the data buses is written into the lower portion 41 and then the upper portion 42 in an alternating manner while data that is read out and supplied to the other data bus is read from the upper portion 42 and then the lower portion 41 in an alternating manner which is the opposite of that used for the writing of data into the storage array 26. More particularly, the mode control logic 58 includes full/empty logic circuitry coupled to the write circuitry and to the read circuitry for switching the state of the two-state mode latch 60 when one of the upper and lower storage array portions becomes full of data and the other of the upper and lower storage array portions becomes empty of data.

This full/empty logic circuitry includes a ping full latch 63 and a pong full latch 64. The set (S) input of the ping full latch 63 is connected to the output of an AND circuit 65, the inputs of which are connected to the mode latch output line 61 and to the output an AND circuit 66. The multiple inputs of the AND circuit 66 receive the multibit address value contained in the input address register (IAR) 45. The output of AND circuit 66 goes active (binary one level) when the address count in IAR 45 reaches its maximum value. When this occurs, all output lines of the address register 45 are at the binary one level and this, in turn, activates AND circuit 66 to produce a binary one level at its output. Thus, a binary one level at the output of AND circuit 66 indicates that IAR 45 is at its maximum (MAX) count value.

After the incoming data for this maximum address value is stored into array 26, the input address register 45 is automatically rolled over or wraped back to its initial starting value. This resets register 45 to the starting address preparatory to the commencement of the next of the ping and pong operating modes.

Assuming for the moment that the mode latch 60 is in the ping mode ("ping" buffer portion 41 being written), then the occurrence of this IAR maximum value indicates that the ping buffer portion 41 is full. The occurrence of these two conditions (ping mode and IAR=-MAX), causes AND circuit 65 to produce a binary one level output signal which serves to switch the ping full latch 63 to the set condition. This condition indicates that the ping buffer portion 41 is full of data. In this condition, the Q output of latch 63 is at the binary one level and the $\overline{Q}$ output is at the binary zero level.

The ping full latch 63 is reset when the ping buffer portion 41 becomes empty of data. To this end the reset (R) input of latch 63 is connected to the output of AND circuit 67, which receives at its two inputs the mode latch output line 62 and the output line from an AND circuit 68. The multiple input lines of AND circuit 68 receive the multibit address value contained in the output address register (OAR) 52. The output line of AND circuit 68 goes to the binary one level when the address count in OAR 52 reaches its maximum (MAX) count value. This maximum address value is indicated by all bits in the OAR 52 being at the binary one level. The occurrence of this maximum count value indicates that all address lines in the storage array portion being read have been accessed which, in turn, denotes that this storage array portion is empty of data or, more precisely, that all the data in that portion has been read.

Assuming for the moment that the data buffer is in the pong mode, (ping buffer portion 41 being read), then mode latch output line 62 is at the binary one level. When the OAR 52 address count reaches its maximum value, which denotes that the reading of the ping buffer portion 41 has been completed, the output of AND 68 goes to the binary one level and the output of AND 67 likewises goes to the binary one level. This latter event resets ping full latch 63. The occurrence of this reset state in latch 63 indicates that the ping buffer portion 41 is empty of data. At this time, the $\overline{Q}$ output of latch 63 goes to the one level and the Q output goes to the zero level.

The pong full latch 64 provides a similar type of function for the pong buffer portion 42 of the storage array 26. The pong full latch 64 is switched to the set (S) state (Q output high) when the pong buffer portion 42 becomes full of data. This is accomplished by way of AND circuit 69, the inputs of which are connected to the mode latch output line 62 and the output line of the AND circuit 66. The pong full latch 64 is switched to the reset (R) state $\overline{Q}$ output high) when the pong buffer portion 42 becomes empty of data. This is accomplished by way of AND circuit 70, the inputs of which are coupled to the mode latch output line 61 and the output of the AND circuit 68.

The full/empty logic circuitry of FIG. 2 further includes an AND circuit 71 which switches the mode latch 60 to the set (S) state (ping mode) upon occurrence of the following three conditions: (1) the buffer is in the pong mode, (2) the ping buffer portion 41 is empty and (3) the pong buffer portion 42 is full. The simultaneous occurrence of these three conditions causes the output of AND 71 to go to the binary one level which, in turn, switches the mode latch 60 to the set or ping mode.

AND circuit 72, on the other hand, resets the mode latch 60 to the pong mode state. In particular, mode latch 60 is reset (R) upon occurrence of the following three conditions: (1) the buffer is in the ping mode, (2) the ping buffer portion 41 is full of data and (3) the pong buffer portion 42 is empty of data. Upon simultaneous occurrence of these three conditions, the output of AND circuit 72 goes to the binary one level to reset the mode latch 60 to put it in the pong mode.

The data buffer mechanism of FIG. 2 further includes request logic circuitry 73 for producing data requests signals for the A and B processors 13 and 16 (FIG. 1). This request logic 73 receives input signals from the mode latch 60, the ping full latch 63 and the pong full latch 64. In each case, both latch outputs are supplied to the request logic 73. The details of a representative embodiment for the request logic 73 are shown in FIG. 5.

Referring to FIG. 5, there is shown in greater detail a representative form of internal construction for the request logic 73 of FIG. 2. The request logic embodiment of FIG. 5 includes AND circuits 75-78, OR circuits 79 and 80, AND circuits 81-84 and OR circuits 85 and 86, interconnected in the manner shown. The inputs of the AND circuits 75-78 are connected to the outputs of the mode latch 60, the ping full latch 63 and the pong full latch 64 of FIG. 2. The outputs of OR circuits 85 and 86 provide the data transfer requests for processor A and processor B, respectively.

When data is being transferred from bus A to bus B, the activation of the AB direction control signal line to the AND circuit 81 enables the processor A request signal to be produced by circuits 75, 76, 79 and 81. In this case, the request to processor A is produced whenever either one of the following two conditions occurs: (1) the buffer mechanism is in the ping mode and the ping buffer portion 41 is not full, and (2) the buffer mechanism is in the pong mode and the pong buffer portion 42 is not full.

When data is being transferred from bus B to bus A the direction control signal BA is active and enables one input of the AND circuit 82. This allows the request to A signal line (output of OR 85) to be controlled by AND circuits 77 and 78 and OR circuit 80. In particular, the request to A signal line will be activated if either one of the following two conditions occurs: (1) the buffer mechanism is in the ping mode and the pong buffer portion 42 is full (more precisely, not empty), and (2) the buffer mechanism is in the pong mode and the ping buffer portion 41 is full (more precisely, not empty).

Turning now to the request to B data transfer request signals, if the data is being transferred from bus B to bus A, then one input of the AND circuit 83 is activated by the BA direction control signal supplied to such input. This enables the request to B output line to be controlled by AND circuits 75 and 76 and OR circuit 79. With BA active, the request to B signal line will be activated (binary one level) if either one of the following two conditions occurs: (1) the buffer is in the ping mode and the ping buffer portion 41 is not full, and (2) the buffer mechanism is in the pong mode and the pong buffer portion 42 is not full.

If, on the other hand data is being transferred from bus A to bus B, the AB signal is active to enable one input to the AND circuit 84. This enables the request to B output line to be controlled by AND circuits 77 and 78 and OR circuit 80. In this case, the request to B line is activated if either of the following two conditions occurs: (1) ping mode and pong buffer portion 42 is full (not empty), or (2) pong mode and the ping buffer portion 41 is full (not empty).

The transfer request signals are generated when the buffer portion being written to has room for more data (is not full) and when the buffer portion being read from is not empty. These data transfer request signals are supplied to the transfer control circuits 21 (FIG. 1) which, in turn, produces corresponding request signals on the appropriate control line in the respective ones of bus A and bus B.

The general operation of the data buffer mechanism of FIG. 2 will now be considered. At the start of a data transfer operation, the mode latch 60 is set to the ping mode, the ping full latch 63 and the pong full latch 64 are reset to their reset states and the input address register 45 and the output address register 52 are reset to their initial starting address values. Both of these address registers 45 and 52 must be reset to the same initial starting address value. Also, the direction control latch in transfer control circuits 21 is set in accordance with the desired direction of data transfer to activate the appropriate one of the direction control signals AB and BA. In the more general case, this initial setup of the various latches and the address registers may be initiated by either processor A or processor B. In some applications, this initial set up responsibility may be assigned to a particular one of the processors.

Assuming that data is to be transferred from bus A to bus B, mode latch 60 starts off in the ping mode and processor A commences to supply data via data bus 15a and to strobe it into the ping buffer portion 41 of the storage array 26. When the ping buffer portion 41 becomes full of data, the mode latch 60 is switched to the pong mode and processor A commences to strobe data into the pong buffer portion 42. While this is going on, processor B commences to strobe data out of the ping buffer portion 41 and to send it out on the processor bus B data bus 18a. When all of the data has been read out of ping buffer portion 41 and the pong buffer portion 42 has been filled up with data, then the mode latch 60 is switched back to the ping mode. Processor A then commences to write data into the ping buffer portion 41 and processor B commences to read data out of the pong buffer portion 42, this process continuing until the ping buffer 41 is again full and the pong buffer portion 42 is again empty. At that point, the mode latch 60 is switched back to the pong mode and the pong mode operations are repeated. This switching back and forth between the ping mode and the pong mode continues until all of the data for the particular data transfer operation in question is transferred from bus A to bus B.

For the case of a data transfer operation in the opposite direction, namely, from bus B to bus A, the data supplied by bus B is written into the ping buffer portion 41 until it becomes full. The buffer mechanism is then switched to the pong mode and the data received on bus B is written into the pong buffer portion 42 while data is, at the same time, read out of ping buffer portion 41 and supplied to bus A. The switching back and forth between the ping mode and the pong mode continues as before until all the data desired to be transferred has been transferred from bus B to bus A.

DESCRIPTION OF THE FIG. 6 DATA BUFFER EMBODIMENT

Figure 6:
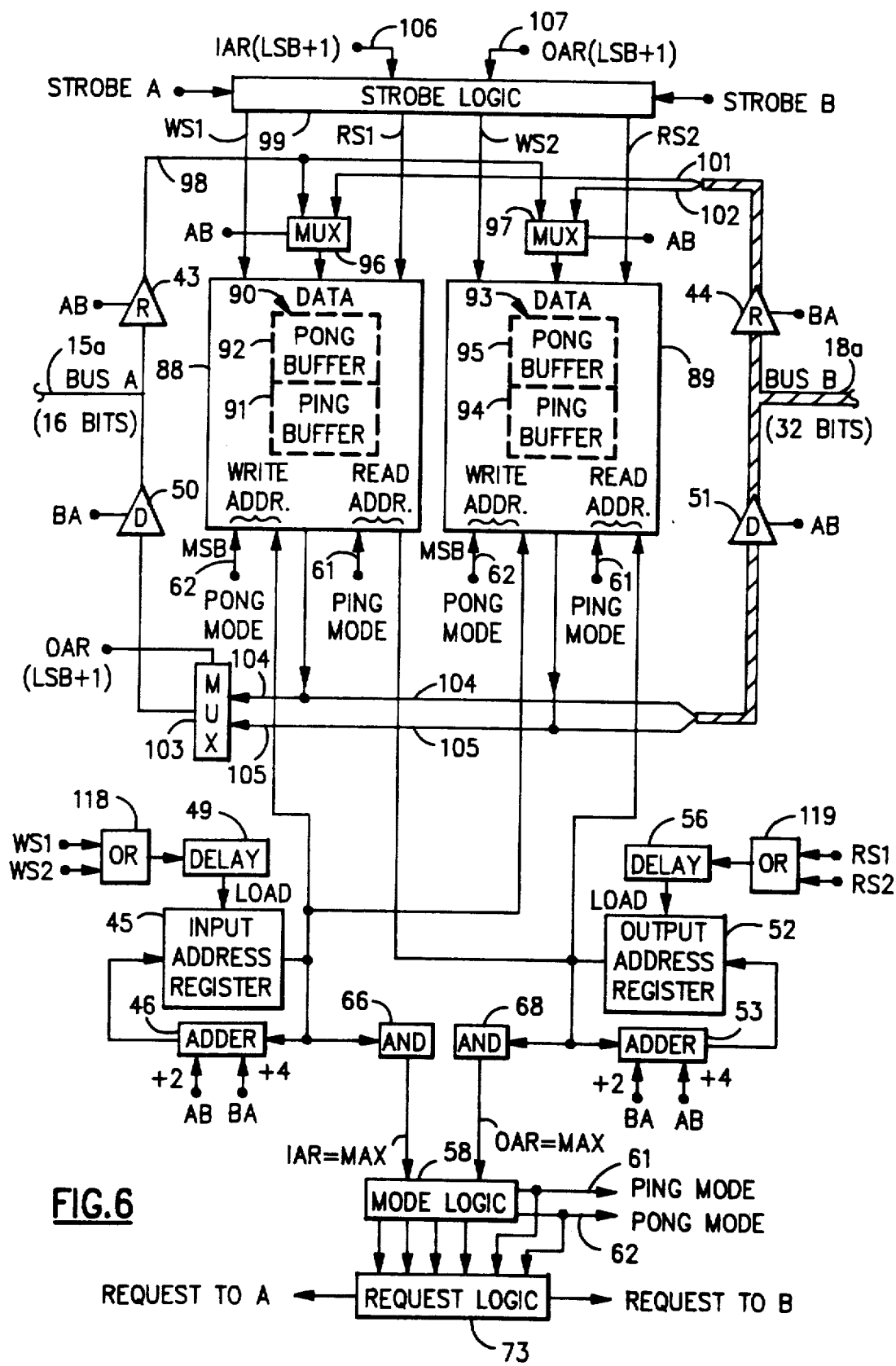
FIG. 6 is a schematic block diagram showing the construction of a second embodiment of a ping-pong data buffer mechanism constructed in accordance with the present invention, which embodiment is particularly useful for the case of data busses having different widths.

Referring to FIG. 6, there is shown a second embodiment of a data buffer mechanism constructed in accordance with the present invention. This embodiment is useful for the case where the bus A data bus and the bus B data bus are not of the same width, that is, do not have the same number of data lines. For sake of example, it is assumed herein that the bus A data bus 15a has 16 data lines, while the bus B data bus 18a has 32 data lines. Thus, the bus A data bus 15a is capable of simultaneously transferring 16 bits (2 bytes) of data, while the bus B data bus 18a is capable of simultaneously transferring 32 bits (4 bytes) of data. In this case, data bus 18a is a wider data bus and data bus 15a is a narrower data bus.

For simplicity of explanation, elements in FIG. 6 which are the same as those in FIG. 2 are identified by the same reference numerals as used in FIG. 2.

The data buffer mechanism of the FIG. 6 embodiment includes a plurality of dual port storage mechanisms with each dual port storage mechanism having a single storage array and two independent ports with separate data, address and control lines. In the FIG. 6 embodiment, there are provided two such dual port storage mechanisms 88 and 89. Each of these dual port storage mechanisms 88 and 89 is of the same internal construction as shown in FIG. 3. As such, the first dual port storage mechanism 88 includes a single internal storage array 90 having a lower address range portion 91 (ping buffer) and a higher address range portion 92 (pong buffer). The second dual port storage mechanism 89 includes a single internal storage array 93 having a lower address range portion 94 (ping buffer) and an upper address range portion 95 (pong buffer). In the present example, each of the storage arrays 90 and 93 is assumed to have an input/output data width of 16 bits. In other words, each addressable storage line in each of the storage arrays 90 and 93 is capable of storing 16 bits of data. Thus, during any given access, 16 bits of data may be written into or read out of each of storage arrays 90 and 93.

When data is being received on the 16-bit data bus 15a, it is alternately stored into the storage arrays 90 and 93. The first two bytes (16 bits) appearing on bus 15a are stored into the first array 90, the second two bytes (16 bits) appearing on bus 15a are stored into the second array 93, the third two bytes appearing on bus 15a are stored in the first array 90, the fourth two bytes appearing on the bus 15a are stored into the second array 93, an so on. In other words, the incoming 16-bit data segments on the bus 15a are alternately stored into different ones of the two storage arrays 90 and 93.

When data is being received on the 32-bit bus 18a, it is simultaneously stored into both of the storage arrays 90 and 93. More particularly, the higher order 16 bits of the data appearing on bus 18a at any given moment are stored into the storage array 90 and the lower order 16 bits are, at the same time, stored into the storage array 93.

In order to accomplish these operations, the data buffer mechanism includes data input multiplexing circuitry for selectively enabling either the simultaneous transfer from the 32-bit bus 18a or the one array at a time transfer from the 16-bit bus 15a. This input multiplexing circuitry includes the previously discussed receiver circuits 43 and 44 and also multiplexer circuits 96 and 97. When storing data received on the 16-bit bus 15a, receiver circuits 43 are enabled and multiplexers 96 and 97 are set to their left hand input positions so that data on the 16-bit data bus 98 is simultaneously applied to the 16-bit data inputs of both the storage array 90 and the first storage array 93. Data on the bus 98 is strobed into the storage array 90 by a write strobe #1 signal (WS1) and is strobed into the second storage array 93 by a separate write strobe #2 signal (WS2), both strobe signals being supplied by strobe logic 99. These write strobe signals WS1 and WS2 are spaced apart in time so that the first, third, fifths, etc. 16-bit segments appearing on bus 15a are strobed into the first storage array 90 and the second, fourth, sixth etc. 16-bit segments appearing on the bus 15a are strobed into the second storage array 93. This sequences the incoming data segments so that they are alternately stored in the first array 90 and the second array 93.

When data received on the 32 bit bus 18a is to be stored, the receiver circuits 44 are enabled and multiplexer circuits 96 and 97 are set to their right hand input positions. The 32 data lines in bus 18a include a set of 16 data lines 101 which carry the higher order 16 bits and a separate set of 16 data lines 102 which carry the lower order 16 bits of the 32-bit data segment then appearing on the bus 18a. The higher order 16 bits on bus 101 are supplied by way of multiplexer 96 to the data input lines of the first storage array 90 while, at the same time, the lower order 16 bits on bus 102 are supplied by way of multiplexer 97 to the data input lines of the second storage array 93. Thus, the entire 32 bits on bus 18a are simultaneously stored into or written into the storage array set provided by arrays 90 and 93.

When data is read out of storage arrays 90 and 93 and supplied to the 16-bit bus 15a, this is done one array at a time in a alternating manner. The selecting between storage arrays 90 and 93 is accomplished by a multiplexer circuit 103. In this case, the driver circuits 50 are enabled to pass data to the 16-bit bus 15a. The first 16-bit segment is obtained from the storage array 90 and supplied by way of a 16-bit bus 104 and the multiplexer circuit 103 to the 16-bit bus 15a. The second 16-bit segment is obtained from the second storage array 93 and supplied by a way of another 16-bit bus 105 and the multiplexer 103 to the 16 bit data bus 15a. The third 16-bit segment is obtained from the first array 90, the fourth 16-bit segment is obtained from the array 93 and so on, with successive 16-bit segments being alternately obtained from the storage array 90 and the storage array 93.

When data is read out from the storage arrays 90 and 93 and supplied to the 32-bit bus 18a, such read out and supplying is done in a simultaneous manner. In this case, both of the arrays 90 and 93 are simultaneously accessed to simultaneously provide 16 higher order data bits on bus 104 and 16 lower order data bits on bus 105. The data bits on both of buses 104 and 105 are simultaneously transferred by way of driver circuits 51, which are enabled at this time, to the 32-bit data bus 18a.

The storing (writing) of data into the arrays 90 and 93 and the reading of data out of the arrays 90 and 93 is done in the ping pong manner previously described for the embodiment of FIG. 2. In the FIG. 6 embodiment, the two storage arrays 90 and 93 are operated in unison relative to the ping-pong operation. The ping mode control signal on output line 61 of mode logic 58 is supplied to the most significant bit (MSB) read address line of each of the arrays 90 and 93. The pong mode control signal on output line 62 of mode logic 58, on the other hand, is supplied to the MSB write address line of each of the arrays 90 and 93. Mode logic 58 of FIG. 6 is of the same construction as the mode logic 58 of FIG. 2.

Storage arrays 90 and 93 are switched back in forth in unison between the ping mode and the pong mode. When in the ping mode, incoming data is written into the lower address portions 91 and 94 of the two arrays and is or may be at the same time read out of the upper address portions 92 and 95 of the arrays. Conversely, when the data buffer of FIG. 6 is in the pong mode, incoming data is written into the upper address portions 92 and 95 and is or may be simultaneously read out of the lower address portions 91 and 94 of the arrays 90 and 93.

The incrementing or updating of the input address register 45 and the output address register 52 is slightly modified relative to that described in FIG. 2. In particular, each of the adders 46 and 53 can update the address value by either a count of two or a count of four, depending on the direction of data transfer. If data is being transferred from bus A to bus B, then the address in IAR 45 is increased by a count of two each time 16 bits (2 bytes) of data is stored into one of the storage arrays 90 and 93. At the same time, the address in OAR 52 is increased by a count of four each time 32 bits (4 bytes) of data is read out of the arrays 90 and 93 and transferred to the 32-bit bus 18a. This is accomplished by the active status of the AB direction control signal which activates the +2 input of adder 46 and the +4 input of adder 53.

When transferring data in the opposite direction, namely, from bus B to bus A, the BA direction control signal is active to activate the +4 input of adder 46 and the +2 input of adder 53. Thus, the IAR address is increased by a count of four each time 32 bits of data is written into arrays 90 and 93 and the OAR address is increased by a count of two each time 16 bits of data is read out from one of the arrays 90 and 93.

Figure 7:
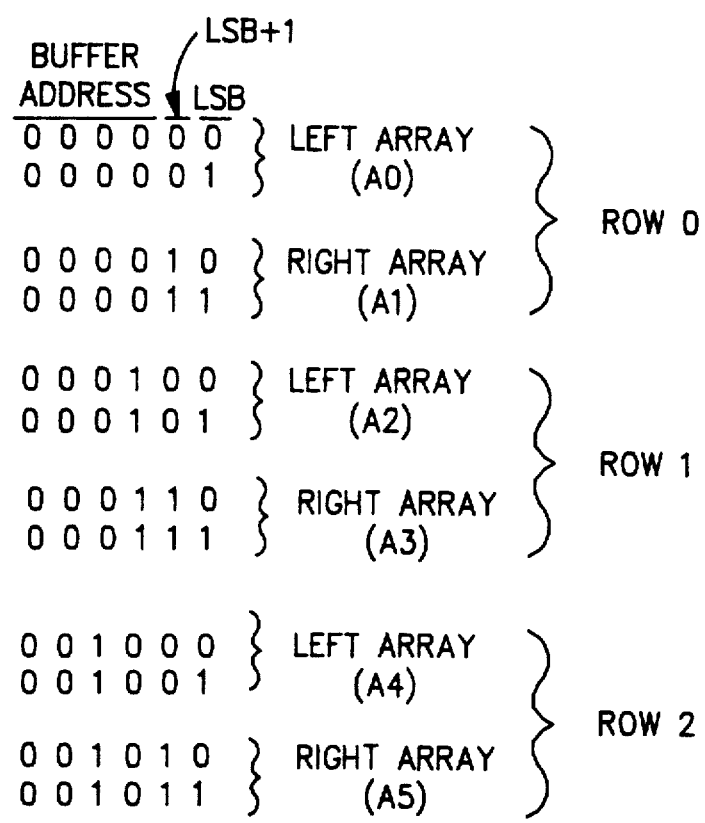
FIG. 7 is a chart used in explaining the addressing operations in the FIG. 6 embodiment.

Referring to FIG. 7, there is shown a chart of the first twelve address values that may be used for each of the input address register 45 and the output address register 52. Each of these address registers 45 and 52 keeps track of the data address down to the byte. Since the two storage arrays 90 and 93 effectively accommodate four bytes of data at a time, the two lowest order address bits are not physically used to address the storage arrays 90 and 93. These two lowest order bits appear in the LSB (least significant bit) and the LSB +1 columns in FIG. 7. Only the remaining higher order address bits appearing under the heading "buffer address" are supplied to the read and write address lines of the storage arrays 90 and 93. When these higher order address bits in the input address register 45 for example have a value of "0000", then, assuming the ping mode, the lower most row (row 0) is accessed in each of the two ping buffer portions 91 and 94. If, on the other hand, the buffer mechanism were in the pong mode, then the lower most row is accessed in each of the two pong buffer portions 92 and 95.

As seen in FIG. 7, the LSB +1 address bit can be used to distinguish which of the two storage arrays 90 and 93 is to be used for a 16-bit transfer to or from the 16-bit bus 15a. Thus, for example, the LSB +1 bit in the output address register (OAR) 52 is supplied to the multiplexer 103 for selecting which of the two 16-bit input buses 104 and 105 is to be connected to the 16-bit output bus of the multiplexer 103. If the LSB +1 bit has a binary value of zero, then the 16 bits of data are read out of the left storage array 90 and supplied by way of bus 104 and multiplexer 103 to the 16-bit bus 15a. If, on the other hand, the LSB +1 bit has a value of one, then 16 bits of data are read out of the righthand storage array 93 and supplied by way of bus 105 and multiplexer 103 to the 16-bit bus 15a.

Figure 8:
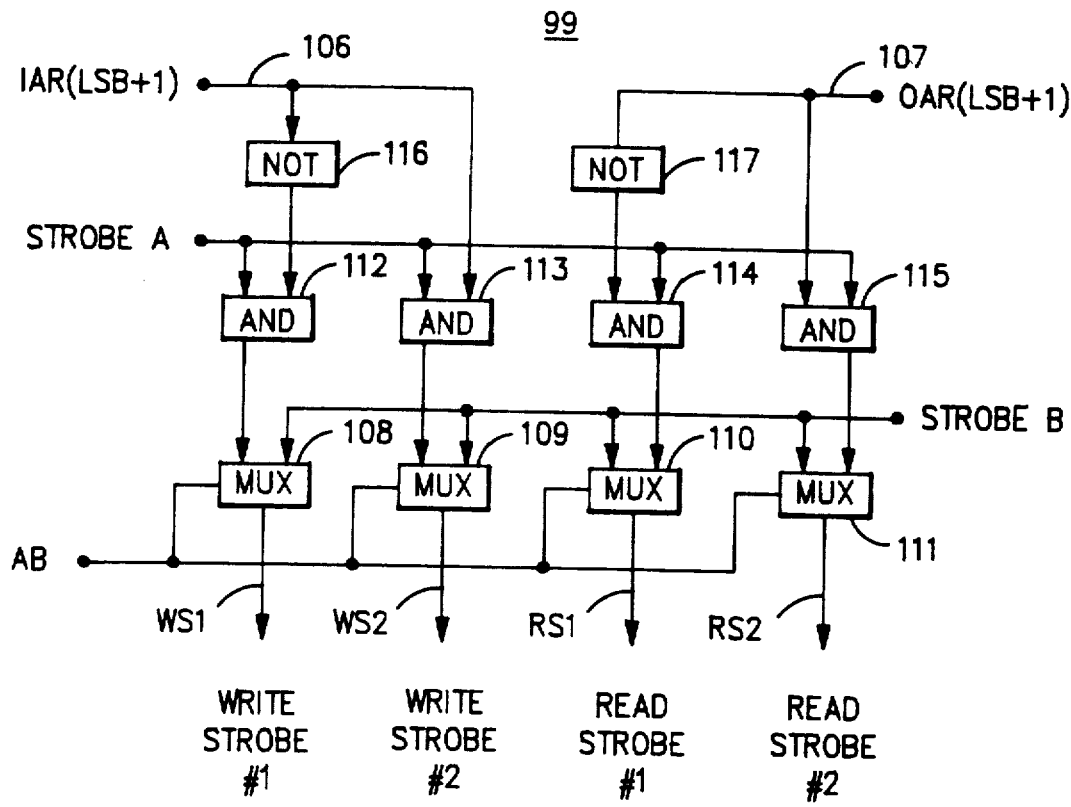
FIG. 8 shows in greater detail the internal construction of the strobe logic of FIG. 6.

Referring to FIG. 8, there is shown in greater detail a rejresemtatove internal construction for the strobe logic 99 of FIG. 6. This strobe logic 99 receives the strobe A and strobe B signals and the direction control signal AB. It also receives on input line 106 the LSB +1 address bit signal from the input address register (IAR) 45. It further receives on input line 107 the LSB +1 address bit signal from the output address register (OAR) 52.

Considering first the case of a bus A to bus B data transfer, the direction control signal AB is active. This sets multiplexer circuits 108-111 to their lefthand input positions. This enables the strobe A signals supplied via AND circuits 112 and 113 to produce the write strobe signals WS1 and WS2. This further enables the strobe B signals supplied to the lefthand inputs of multiplexers 110 and 111 to produce the read strobe signals RS1 and RS2. Thus, each strobe B signal simultaneously produces both an RS1 and an RS2 read strobe. Thus, data is simultaneously read out of both of the storage arrays 90 and 93 and supplied to the 32-bit bus 18a.

The write strobes WS1 and WS2, on the other hand, need to alternate back and forth between the two storage arrays 90 and 93. This is accomplished by use'of the LSB +1 address bit from the input address register 45. In particular, if the LSB +1 bit has a binary value of zero, this zero value is inverted by a NOT circuit 116 to produce an output one value which enables the second input of AND circuit 112. In this case, the strobe A signal is supplied by way of AND 112 and multiplexer 108 to produce the WS1 write strobe which strobes data into the left storage array 90.

If on the other hand, the LSB +1 address bit on line 106 has a binary one value, then the other AND circuit 113 is enabled to pass the strobe A signal by way of AND 113 and multiplexer 109 to produce the WS2 write strobe which is supplied to the right storage array 93. In this case, the 16 bits of data on bus 98 (FIG. 6) are stored into the right storage array 93. In this manner, the writing of data received from the 16-bit bus 15a alternates back and forth between the left array 90 and the right array 93 under the control of the LSB +1 address bit from input address register 45.

For the case of a data transfer in the opposite direction, namely, from bus B to bus A, the direction control signal AB is not active and the multiplexer circuits 108-111 assume their righthand input positions. In this case each strobe B signal is supplied by way of multiplexers 108 and 109 to simultaneously produce both the WS1 and the WS2 write strobes. Thus, data from the 32-bit bus 18a is simultaneously stored into both of the storage arrays 90 and 93.

The RS1 and RS2 read strobes are produced by the strobe A signals under the selective control of the LSB +1 address bit supplied to input line 107 by the output address register 52. If this LSB +1 address bit is zero, then such zero value is inverted by a NOT circuit 117 to enable the AND circuit 114 to past a strobe A signal to the multiplexer 110 to produce at the output thereof the RS1 read strobe. This RS1 read strobe strobes 16 bits of data out of the left storage array 90.

If the LSB +1 address bit on line 107 has a value of one, then AND 115 is enabled to pass a strobe A signal to multiplexer 111 to, in turn, produce on the output line thereof the RS2 read strobe signal. This RS2 read strobe strobes 16 bits of data out of the right storage array 93. In this manner, the strobing or reading of data from the two arrays 90 and 93 is done in a alternating manner from one array at a time.

Figure 9:
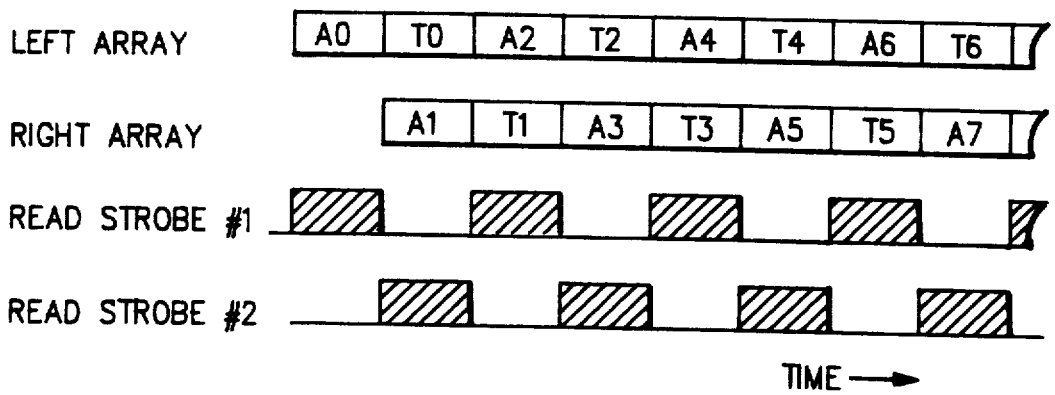
FIG. 9 is a timing diagram used in explaining part of the operation of the FIG. 6 embodiment.

Referring to FIG. 9, there is shown a timing diagram for the readout of data from the storage arrays 90 and 93 and its transfer to the 16-bit data bus 15a. Intervals A0, A1, A2, etc. represent data access intervals roles at which times data is accessed from the storage arrays 90 and 93. Intervals T0, T1, T2, etc. represent intervals when data is transferred by the multiplexer 103 to the 16-bit bus 15a. The letter A denotes access and the letter T denotes transfer. The numbers 0, 1, 2, 3, etc. denote the particular 16-bit data segments which are involved. FIG. 9 also shows the RS1 and the RS2 strobe signals. As seen, they occur in an interleaved manner.

As seen from FIG. 9, the accessing of data segment zero from the left array 90 occurs during the occurrence read strobe #1. The transfer of this data segment 0 by multiplexer 103 occurs during the occurrence of read strobe #2. The accessing of the next data segment, namely, data segment, one from the right array 93 occurs during read strobe #2. This data segment one is transferred by multiplexer 103 during the next read strobe #1. This process is repetitive in the manner shown in FIG. 9.

An important feature to note in FIG. 9 is that (except for the very first ascess A0) the accessing of data from the left array 90 is overlapped with the transfer of data obtained from the second array 93 and vice versa. Thus there is no wasted time. Thus, prevents the occurrence of "wait states" on the 16-bit data bus 15a and helps maintain a high rate of data throughput from bus B to bus A.

The write strobes WS1 and WS2 and the read strobes RS1 and RS2 are also used to update the input address register 45 and the output address register 52, respectively. More particularly, WS1 and WS2 strobes are supplied by way of an OR circuit 118 and the delay circuit 49 to the count update line of the input address register 45. If both WS1 and WS2 occur simultaneously, then only one update of the address register 45 is produced. If WS1 and WS2 occur at different times, then each produces an update of the address register 45.

In a similar fashion, the RS1 and RS2 read strobes are supplied by way of an OR circuit 119 and the delay circuit 56 to the count update line of the output address register 52. If RS1 and RS2 occur simultaneously, then only a single update of the address register 52 is produced. If they occur separately, then each produces an update of the address register 52.

For the case where the system of FIG. 1 is used to provide an I/O adapter in the manner represented by dash-line box 23, processor A will be a host processor and processor B will most likely be a microprocessor. In this case, the roles of bus A and bus B in FIG. 6 would most likely need to be interchanged. In other words, for this application the 16-bit data bus coming in from the left should be identified as bus B and the 32-bit data bus coming in from the right should be identified as bus A. This is because the host processor would, in most cases, be the one with the 32-bit bus and the microprocessor would be the one with the 16-bit bus. The labeling of the other pairs of direction dependent signals (strobe A and strobe B, AB and BA, and request to A and request to B) would also need to be interchanged. This is, of course, merely a change of labels and does not change the operation of the in FIG. 6 embodiment as set forth above.

DESCRIPTION OF FIG. 10 PROGRAMMABLE BURST LENGTH FEATURE

Figure 10:
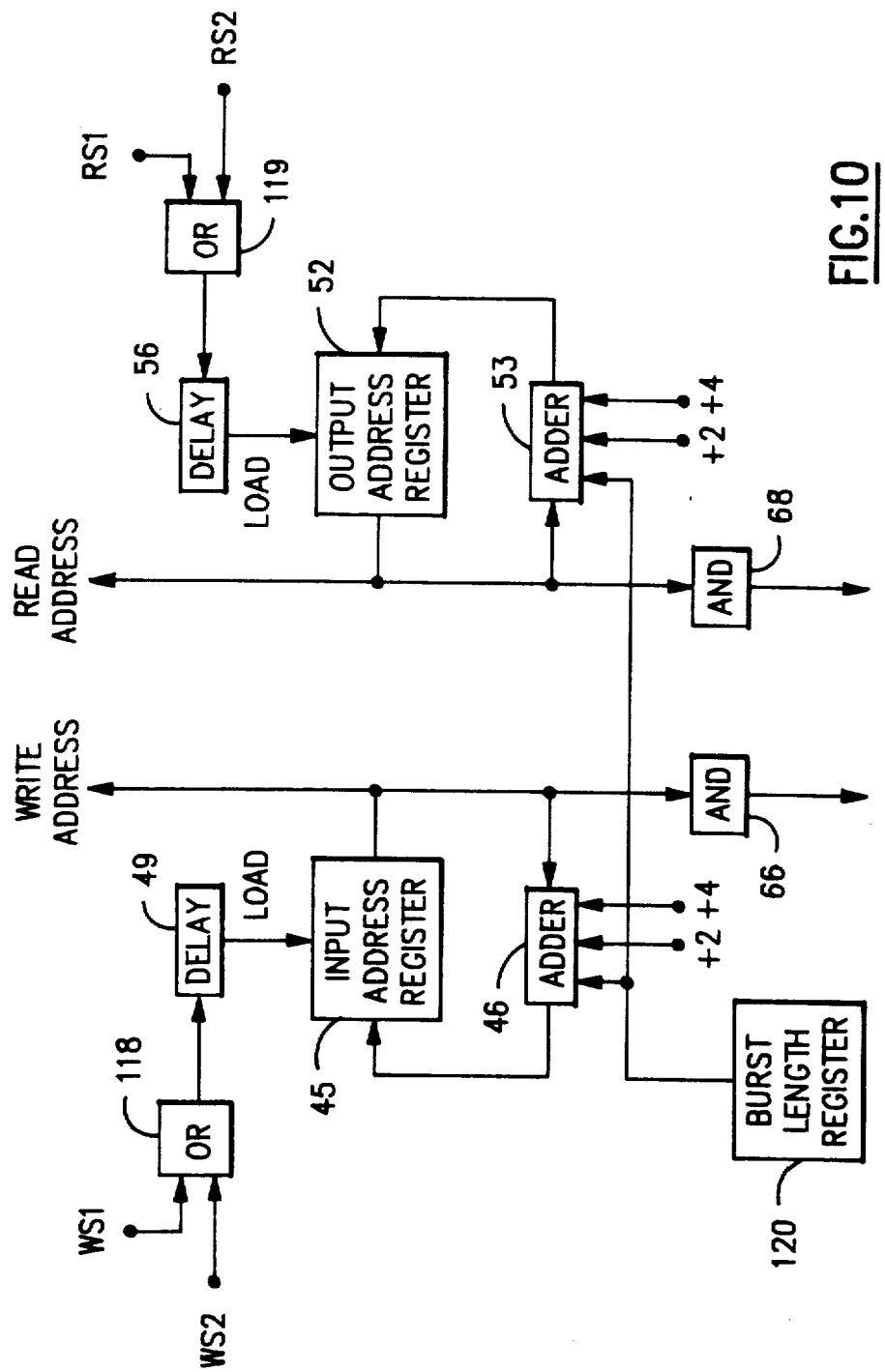
FIG. 10 shows the provision of a programmable burst length feature which may be used in either the FIG. 2 or the FIG. 6 embodiment.

Referring to FIG. 10, there is shown an additional feature which may be used advantageously in those applications where data is transferred from one data bus to the other data bus in discrete sequential bursts with each burst containing at most a maximum predetermined amount of data (maximum number of bytes). FIG. 10 shows this feature as being applied to the FIG. 6 embodiment, but it is equally applicable to the FIG. 2 embodiment. FIG. 10 shows the input and output address circuitry portion of FIG. 6, with corresponding elements being identified by the same reference numerals as used in FIG. 6.

The new feature in FIG. 10 is the provision of programmable burst length circuitry coupled to the write address circuitry and the read address circuitry for limiting the maximum amount of data stored into the lower and upper portions of the storage arrays 90 and 93 to make such amount equal to the maximum predetermined amount for the data bursts being transferred. This circuitry is represented by a programmable burst length register 120 which is connected to and supplies to each of the adder circuits 46 and 53 a maximum burst length byte value.

Assume, for example, that the maximum burst length for the data being transferred is 64 bytes. In this case, for the typical data transfer operation, the data is transferred in a series of 64-byte bursts from one bus to the other.

The purpose of the burst length register 120 is to manipulate the input address register 45 so that it will show the ping buffer portions 91 and 94 of the arrays 90 and 93 as being full of data when a total of 64 bytes have been stored into these two ping buffer portions 91 and 94 (32 bytes each). Similarly, when data is being written to the pong buffer portions 92 and 95, the input address register 45 produces the buffer full condition when a total of 64 bytes have been stored into these pong buffer portions.

The burst length register 120 also manipulates the output address register 52 to produce a buffer empty condition (OAR=MAX) when 64 bytes have been read out of either the ping buffer portions 91 and 94 or the pong buffer portions 92 and 95. In this manner, the mode logic 58 (mode latch 60) is switched each time 64 bytes of data have been received and transferred on to the second data bus.

The burst length register is programmable and the maximum burst length value set therein may be changed to accommodate the particular data processing system in which the data buffer mechanism is being used. If data is being transferred in 64-byte bursts, then a count value of 64 is loaded into the burst length register 120. If, on the other hand, data is being transferred in 32-byte bursts, then a count value of 32 is loaded into the burst length register 120. In other words, the count value loaded into the burst length register 120 is made to correspond to the burst length of the data being transferred. For each of the adders 46 and 53, the count value in the burst length register 120 is added to the other numbers being added by the adder in such a way that the maximum address value (all ones) is produced by the associated address register when the number of data bytes written or read becomes equal to the maximum number for the data bursts being transferred.

The desired burst length value is loaded into the burst length register 120 at the beginning of each data transfer operation by the transfer control circuits 21 (FIG. 1). In a dynamic system, this burst length value (sometimes called line length value) is supplied to the transfer control circuits 21 by one or the other of processor A or processor B.

This programmable burst length feature enables the efficiency of the data transfer operations to be maximized in those data processing systems where data is transferred in discrete multibyte bursts.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A system for transferring data from a first data bus to a second data bus, said system comprising:

a dual port storage device having a storage array and first and second independent ports with separate data, address and control lines;

write circuitry means, coupled to said first independent port and said first data bus, for writing data from said first data bus into a first portion of said storage array during a first mode of operation, and writing data from said first data bus into a second portion of said storage array during a second mode of operation, each of said first and second portions of said storage array having a capacity large enough to store data written during multiple uses of said first data bus;

first clock means, associated with data on said first data bus and coupled to said dual port storage device, for timing the writing of said data from said first data bus into said first and second portions of said storage array;

read circuitry means, coupled to said second independent port and said second data bus, for reading data from said second portion of said storage array onto said second data bus during said first mode of operation, said reading from said second portion occurring simultaneously with the writing of data into said first portion of the storage array during said first mode of operation, and reading data from said first portion of the storage array onto said second data bus during said second mode of operation, said reading from said first portion occurring simultaneously with the writing of data in said second portion of the storage array during said second mode of operation;

second clock means, associated with data on said second data bus and coupled to said dual port storage device, for timing the reading of said data from said first and second portions of the storage array onto said second data bus, said second clock means being asynchronous with said first clock means; and means for limiting the maximum amount of data that can be written into said first portion and read from said second portion during said first mode of operation and written into said second portion and read from said first portion during said second mode of operation, based on discrete sequential burst length requirements of a reader or writer of the data within said first and second portions, said limiting means being programmable by said reader or said writer and to set said maximum amount less than the capacity of said first portion and less than the capacity of said second portion;

mode control means for switching said write circuitry means and said read circuitry means between said first and second modes of operation when data written from said first data bus fills one of said storage array portions to said maximum amount, which data has not yet been read onto said second data bus, and all data in the other storage array portion has been read onto said second data bus.

* * * * *